JOHN J. FIELDS.

Railroad-Car Spring.

No. 126,794.  Patented May 14, 1872.

Witnesses:
Fred Haynes
Benj. P. Sharp.

John J. Fields
per Munn Coombs & Co.
A. Homeyer

AM. PHOTO-LITHOGRAPHIC CO. N.Y. (OSBORNE'S PROCESS.)

UNITED STATES PATENT OFFICE.

JOHN J. FIELDS, OF BROOKLYN, NEW YORK.

IMPROVEMENT IN CAR-SPRINGS.

Specification forming part of Letters Patent No. 126,794, dated May 14, 1872.

Specification describing a certain Improvement in India-Rubber Springs for Railway Cars and other purposes, the invention of JOHN J. FIELDS, of the city of Brooklyn, in the county of Kings and State of New York.

This invention relates to India-rubber springs for railway-cars and other purposes; and consists in a combination of a cylindrical or other shaped body of India rubber, either solid or hollow, with an open-work frame or cage, when these two parts are so constructed as to present salient points or surfaces of contact running in direction of the length of the spring, with intervening similarly-arranged or longitudinal open spaces in the walls of the cage or frame for dust or dirt to escape, as well as to provide for the distension of the rubber, and whereby cutting and choking of the rubber are avoided and the rubber is stiffened or supported throughout its length, likewise a very large and efficient resistance against pressure applied to the spring, combined with the most perfect elasticity, is obtained. A follower having longitudinal corrugations, either throughout the whole or a portion of its length, may be used to advantage in connection with the open-work frame or cage constructed as described.

Figure 1:
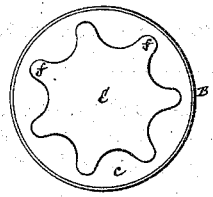
Figure 2:
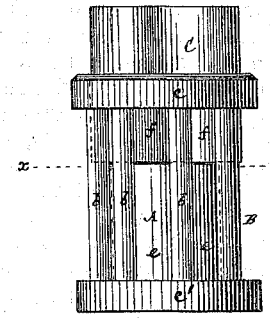
Figure 3:
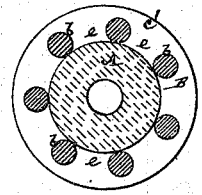

In the accompanying drawing which forms part of this specification, Figure 1 represents an end view or plan of a car-spring constructed in accordance with my invention; Fig. 2, a side view of the same, and Fig. 3, a transverse section at the line $x$ $x$ in Fig. 2.

Similar letters of reference indicate corresponding parts throughout the several figures of the drawing.

A is an India-rubber cylinder, and B an open-work frame or cage inclosing the same. Said cage is constructed of longitudinally-arranged rods or bars $b$ $b$ between ends or heads $c$ $c'$, the one, $c$, of which has an opening through it for the passage of the follower C, and the bars $b$ $b$ being so spaced as not only to present salient points or surfaces of contact between them and the rubber, running in direction of the length of the spring, and serving to bind the rubber longitudinally at interspersed points or lines, but likewise clear, open, intervening spaces $e$ $e$ between the bars for the distension of the rubber when the spring is compressed, and (which is also very important) for the escape of dust and dirt to prevent cutting or choking of the rubber, and whereby increased freedom is given to the action of the spring. The follower C, which may either be corrugated or plain, rests upon the working end of the rubber and forms a bearing for the load. It is here shown, however, as constructed with longitudinal corrugations $f$ $f$, corresponding to the open spaces $e$ $e$ between the bars, so as to have a bearing upon the distended portions of the rubber when compressed, and whereby the follower is guided in its action; also any dust, dirt, or obstacle more effectually forced out through the open spaces $e$ $e$ of the cage.

What is here claimed, and desired to be secured by Letters Patent, is—

1. The open-work frame or cage B, when constructed of longitudinally-arranged salient bearings $b$ $b$ for the rubber, with longitudinally disposed open intervening spaces $e$ $e$ between them, in combination with the rubber spring A and follower C, substantially as specified.

2. The combination, with the open-work frame or cage B, constructed as described, of the longitudinally-corrugated follower C and the rubber spring A, essentially as specified.

JOHN J. FIELDS.

Witnesses:
 FRED. HAYNES,
 R. E. RABEAU.